United States Patent Office 3,525,042
Patented Aug. 18, 1970

3,525,042
METHOD AND APPARATUS FOR STATISTICALLY MEASURING ELECTRICAL POWER CONSUMPTION
Hans Nunlist, Baar, Zug, and Werner Jose Luthi, Cham, Zug, Switzerland, assignors to Landis & Gyr, Zug, Switzerland, a corporation of Switzerland
Filed Nov. 8, 1968, Ser. No. 774,348
Claims priority, application Switzerland, Nov. 13, 1967, 15,838/67
Int. Cl. G01r 21/00
U.S. Cl. 324—142          13 Claims

ABSTRACT OF THE DISCLOSURE

A method and circuitry for statistically measuring electrical power consumption for the parameters of voltage and current whereby one parameter is converted to a first train of pulses wherein the product of frequency and pulse width is proportional to that parameter, the second parameter is converted to a second train of pulses wherein the frequency is proportional to the second parameter and the width of the pulses is constant and much smaller than the width of the pulses in the first pulse train, both pulse trains are inputs to a coincidence circuit the output of which is a third train of pulses the average frequency of which is a measure of the power, and the output of the coincidence circuit is counted to measure the power consumed.

---

Figure 1:
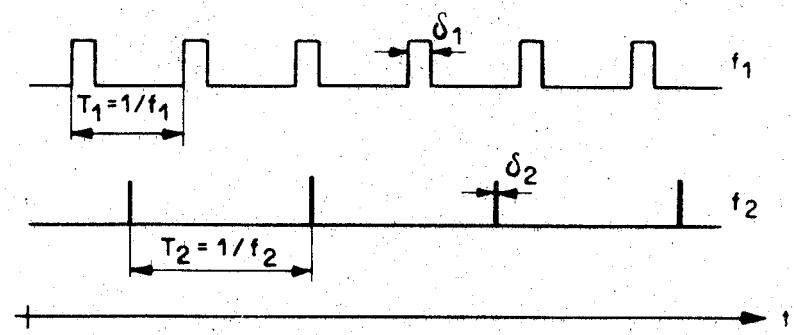

The present invention relates to a method and circuitry for measuring electrical active energy by forming the product of voltage and current by means of a statistical coincidence method. A train of pulses related to the voltage is fed to one input of a coincidence circuit and a second train of pulses related to the current is fed to a second input of the same coincidence circuit.

At the output of this coincidence circuit are pulses statistically distributed in time.

Before proceeding further it is instructive to define two very common terms, viz. power and energy. Power is energy per unit time. Concomitantly, energy is the product of power and time. For example, if a pulse train existed in which the frequency of the pulses was directly related to power, then counting these pulses over a specified period of time would yield a measure of the energy content over that same period of time.

A known method exists for forming the product of voltage and current employing statistical coincidence. According to this method a train of rectangular pulses is formed with the pulse width proportional to the voltage. A second train of rectangular pulses is formed wherein the pulse width is proportional to the current. These two pulse trains are then compared in an electronic coincidence circuit. At the output of this coincidence circuit a train of pulses appears having an average voltage which is proportional to the power.

In order to determine the energy, a further train of pulses must be formed having a frequency proportional to this average voltage. This is necessary in order to measure the power over a specified period of time and, hence, the energy content for that period of time. The conversion of the average voltage to a pulse train can be accomplished through the use of a voltage to frequency converter, for example, a voltage controlled oscillator followed by a pulse forming circuit. This additional step of translating average voltage into a pulse train whose frequency is related to the average voltage introduces additional measurement errors. Furthermore, this known method is quite costly.

A further disadvantage of the known method is that accurate voltage to frequency converters have a relatively high output frequency. This necessitates employing a pulse counter, for counting the pulses from the voltage to frequency converter, having a large storage capacity.

The disadvantages of the known method are eliminated in accordance with the method of this invention in that a first train of pulses wherein the product of pulse frequency and pulse width is proportional to the voltage or current and a second train of pulses wherein the pulse frequency is proportional to the current or voltage and the pulse width is constant, a further condition being imposed on the pulses in the second pulse train that the width of these pulses is very small as compared with the width of the pulses in the first pulse train, are compared for coincidence and the result of that comparison continuously counted to measure the active energy.

A circuit for carrying out this method is characterized in accordance with the invention by a voltage or current pulse converter which produces a first train of pulses having the characteristic that the product of pulse width and pulse frequency is proportional to the voltage or current, a current or voltage pulse converter which produces a second train of pulses having the characteristic that the pulse frequency is proportional to the current or voltage and the width of the pulses in the second pulse train is very small as compared to the width of the pulses in the first pulse train, a coincidence circuit having at least two inputs, one input being connected to the output of the first pulse converter and the second input being connected to the output of the second pulse converter, and a pulse counter connected to the output of the coincidence circuit.

Figure 2:
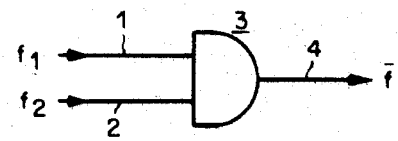
Figure 3:
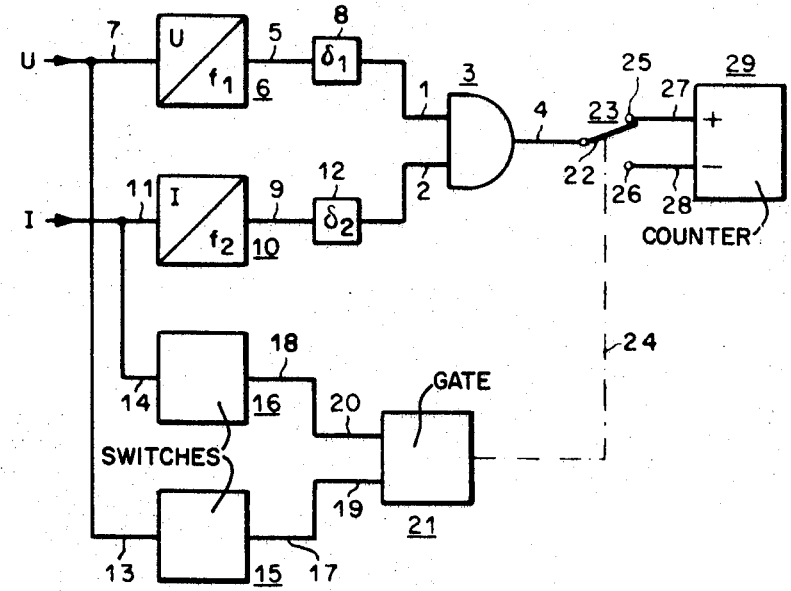

Several illustrative embodiments of the invention are described in the following specification. The specification includes the drawings wherein:

FIG. 1 is a pulse diagram;
FIG. 2 is an AND gate shown symbolically; and
FIG. 3 is a block diagram of an energy meter.

In FIG. 1 there is shown a first pulse train with a frequency $f_1$, a period $T_1$ and a pulse width $\delta_1$. A second pulse train is shown with a frequency $f_2$, a period $T_2$ and a pulse width $\delta_2$.

There exists the relationship $$\delta_2 \ll \delta_1$$

For the first general remarks, assume that the pulse width $\delta_2$ is infinitely small. Furthermore, assume that the ratio of frequency $f_1$ to frequency $f_2$ is an irrational number.

The probability $p$ that a pulse of the second pulse train will coincide in time with a pulse of the first pulse train is, in accordance with the definition of probability $$P = \frac{\delta_1}{T_1} = \delta_1 \cdot f_1$$

In FIG. 2 the first pulse train is fed to the input 1 and the second pulse train is fed to the input 2 of an AND gate 3. At the output 4 of the AND gate a pulse appears when and only when a pulse is present simultaneously at both inputs.

The mean frequency $\bar{f}$ of the pulses statistically distributed in time appearing at the output 4 is proportional to the probability $p$ of coincidence and the frequency $f_2$ namely:

$$\bar{f} = p \cdot f_2 = \delta_1 \cdot f_1 \cdot f_2$$

When the product of pulse frequency $f_1$ and pulse width $\delta_1$ of the first train of pulses is proportional to the voltage U and the pulse frequency $f_2$ of the second train of pulses is proportional to the current I, then, assuming voltage and current to be constant, the following relationships exist:

$$\delta_1 \cdot f_1 = k_1 \cdot U$$
$$f_2 = k_2 \cdot I$$

and $$\overline{f} = k_1 \cdot k_2 \cdot U \cdot I$$

The middle output frequency $\overline{f}$ is therefore proportional to the power $(U \cdot I)$. By continuous counting of the output pulses, i.e. by integration of the power with respect to time, the amount of the energy can be determined. The result, in accordance with Bernoulli's theorem, is more accurate the longer the measurement lasts.

Up to now, has been assumed that voltage and current are constant. Theoretical and experimental investigations have shown that the measurement method described can be employed without limitation even when voltage and current vary with time. In particular the proposed method can also be used for measuring the active energy of alternating current and voltage when the statistically distributed pulses are counted backwards where there is a negative instantaneous value of the product of current and voltage.

If U is the effective value of the voltage, I the effective value of current, $\phi$ the phase angle between voltage and current $t$ the time, one then obtains as a result of the integration, the active energy $$W = U \cdot I \cdot \cos \phi \cdot t$$

A further development of the inventive concept exists where the pulse width $\delta_1$ of the first pulse train is constant. Under these circumstances:

$$f_1 = k_3 \cdot U$$
$$f_2 = k_4 \cdot I$$

and $$\overline{f} = \delta_1 \cdot k_3 \cdot U \cdot I$$

In the following there will now be explained, based on the last mentioned case, how the inventive concept can be carried out in practice.

In FIG. 3, the AND gate in FIG. 2 is provided with the same reference numbers. The output 5 of a voltage to frequency converter 6 on whose input 7 the voltage U appears is connected via pulse forming circuit 8, which could be a monostable multivibrator, to the input 1 of AND gate 3. The output 9 of a current to frequency converter 10 to whose input 11 the current I is fed is applied via a pulse forming circuit 12, which could be a monostable multivibrator, to input 2 of AND gate 3. The voltage U and the current I respectively are fed to the inputs 13 and 14 respectively of switches 15 and 16 respectively whose outputs 17 and 18 respectively are connected with the inputs 19 and 20 respectively of gate 21. Gate 21 is in the logical state "1" when both inputs 19 and 20 have the same logical state. The output 4 of AND gate 3 is connected to contact arm 22 of switch 23 from which an active connection 24 leads to gate 21. Switch 23 whose function is represented symbolically can, of course, be replaced by electronic switch elements performing the same function. Contact 25 of switch 23 is connected to the forward counting input 27 and contact 26 to the backward counting input 28 of pulse counter 29.

At the input 1 of AND gate 3 there appears a pulse train whose frequency $f_1$ is proportional to the voltage U and the pulse width $\delta_1$ of which is constant. At the input 2 of AND gate 3 there appears a pulse train whose frequency $f_2$ is proportional to the current I and whose pulse width $\delta_2$ is constant and very small as compared with the pulse width $\delta_1$. The average value of the frequency $\overline{f}$ of the statistically distributed pulses occurring at output 4 of AND gate 3 is proportional to the instantaneous value of the power.

The output 17 of switch 15 is in logical state "1" when the instantaneous value of its input is positive and in the logical state "0" when it is negative. The same applies to the output 18 of switch 16. Gate 21 actuates switch 23 so that it is in the position of positive counting direction when both inputs 19 and 20 have the same logical state. Thus the output pulses of AND gate 3 are added in pulse counter 29 when the instantaneous value of the product of current and voltage is positive. With a negative instantaneous value of the product of current and voltage the output pulses are subtracted so that the active energy can be determined from the instantaneous condition of the pulse counter 29.

In the embodiment shown in FIG. 3, the pulse width $\delta_2$ is very small as compared with the pulse width $\delta_1$. Of course, the pulse width $\delta_1$ can also be kept very small as compared with the pulse width $\delta_2$.

For the consideration of the occurrence of the statistically distributed pulses, it was assumed that the frequencies $f_1$ and $f_2$ or their average values are in an irrational ratio to each other. In the instance of purely ohmic loading of a rigid voltage source with a real internal resistance there is an unequivocal correlation between the frequencies $f_1$ and $f_2$ so that it is not always possible to maintain this assumption. Since, however, in a power distributing network, as a result of the connecting and disconnecting of storage devices of the most varied type and composition, statistical variations of the phase between voltage and current are produced, instantaneous dependence is immediately done away with again. Accordingly, the maintaining of this condition is by no means necessary.

The independence between the frequencies $f_1$ and $f_2$ can be additionally assured by modulating one of the two statistically.

We claim:
1. A method for measuring electrical active energy produced by the parameters of current and voltage, comprising the following steps:
   providing a first train of pulses wherein the product of pulse frequency and pulse width is proportional to one of said parameters;
   providing a second train of pulses wherein
      the pulse frequency is proportional to the other of said parameters, and
      the pulse width is constant and small as compared to the width of the pulses in said first train of pulses;
   comparing said first and second trains of pulses for coincidence to produce a third train of pulses having an average frequency proportional to power; and
   counting the pulses appearing in said third train of pulses to obtain a measure of energy.

2. A method according to claim 1 wherein the width of the pulses in said first train of pulses is constant.

3. A method according to claim 1 wherein the pulses appearing in said third train of pulses are counted in a forward direction when the product of said parameters is positive and counted in a backward direction when said product is negative.

4. A method according to claim 1 wherein the average value of the frequency of said first train of pulses is independent of the average value of the frequency of said second train of pulses.

5. A method according to claim 1 wherein the frequency of one of said pulse trains, which is proportional to one of said parameters, is statistically modulated.

6. Apparatus for measuring electrical active energy produced by the parameters of current and voltage, comprising,
   a first pulse converter for producing a first train of pulses having the characteristic that the product of pulse frequency and pulse width is proportional to one of said parameters;
   a second pulse converter for producing a second train of pulses having the characteristic that the pulse frequency is proportional to the other of said parameters, and the pulse width is constant and small as compared to the width of the pulses in said first train of pulses;

a coincidence circuit,
one input of which is operably connected to the output of said first pulse converter, and
a second input of which is operably connected to the output of said second pulse converter; and a pulse counter operably connected to said coincidence circuit to count pulses produced by said coincidence circuit.

7. Apparatus according to claim 6 wherein said coincidence circuit is an AND gate.

8. Apparatus according to claim 6 wherein said first pulse converter produces a first train of pulses having the characteristic that
the pulse frequency is proportional to one of said parameters and
the pulse width is constant.

9. Apparatus according to claim 8 wherein said first pulse converter employs a monostable multivibrator for producing pulses of constant width.

10. Apparatus for measuring electrical active energy produced by the parameters of current and voltage, comprising,
a first pulse converter for producing a first train of pulses having the characteristic that the product of pulse frequency and pulse width is proportional to one of said parameters;
a second pulse converter for producing a second train of pulses having the characteristic that
the pulse frequency is proportional to the other of said parameters, and
the pulse width is constant and small as compared to the width of the pulses in said first train of pulses;
a coincidence circuit,
one input of which is operably connected to the output of said first pulse converter, and
a second input of which is operably connected to the output of said second pulse converter; and
a reversible pulse counter operably connected to said coincidence circuit to count pulses produced by said coincidence circuit; and
circuit means for controlling the direction of counting of said reversible counter so that
said counter counts in a forward direction when the product of said parameters is positive, and
said counter counts in a backward direction when the product of said parameters is negative.

11. Apparatus according to claim 10 wherein said circuit means includes
a pair of switching devices each responsive to a different one of said parameters and being operable to assume a state corresponding to the polarity of the respective parameter applied thereto, and
a circuit means coupled between said switching devices and said reversible pulse counter to cause said counter to count in one direction when said switching devices are in the same state and in the opposite direction when said switching devices are in different states.

12. Apparatus according to claim 10 wherein said first pulse converter produces a first train of pulses having the characteristic that
the pulse frequency is proportional to one of said parameters and the pulse width is constant.

13. Apparatus according to claim 12 wherein said first pulse converter employs a monostable multivibrator for producing pulses of constant width.

References Cited

UNITED STATES PATENTS 3,067,941   12/1962   Marlot _____ 235—194

FOREIGN PATENTS 1,061,177   4/1954   France.

ALFRED E. SMITH, Primary Examiner

U.S. Cl. X.R.

235—194